(12) United States Patent
Zhao et al.

(10) Patent No.: US 10,067,591 B2
(45) Date of Patent: Sep. 4, 2018

(54) TOUCH DEVICE AND DRIVING METHOD FOR TOUCH CONTROL DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 14/771,080

(22) PCT Filed: Oct. 30, 2014

(86) PCT No.: PCT/CN2014/089910
§ 371 (c)(1),
(2) Date: Aug. 27, 2015

(87) PCT Pub. No.: WO2016/011725
PCT Pub. Date: Jan. 28, 2016

(65) Prior Publication Data
US 2016/0364061 A1    Dec. 15, 2016

(30) Foreign Application Priority Data

Jul. 25, 2014 (CN) .......................... 2014 1 0360047

(51) Int. Cl.
*G06F 3/041* (2006.01)
*G02F 1/1333* (2006.01)
(Continued)

(52) U.S. Cl.
CPC .......... *G06F 3/0416* (2013.01); *G02F 1/1333* (2013.01); *G02F 1/13338* (2013.01);
(Continued)

(58) Field of Classification Search
CPC . G02F 1/01333; G02F 1/13338; G06F 3/0412
See application file for complete search history.

(56) References Cited

U.S. PATENT DOCUMENTS

2002/0024491 A1* 2/2002 Hosoyamada ....... G09G 3/3607
    345/88
2008/0062140 A1* 3/2008 Hotelling ............ G09G 3/3648
    345/173
(Continued)

FOREIGN PATENT DOCUMENTS

CN    101739182 A    6/2010
CN    101866228 A    10/2010
(Continued)

OTHER PUBLICATIONS

First Chinese Office Action dated Oct. 10, 2016; Appln. No. 201410360047.9.
(Continued)

*Primary Examiner* — Jonathan Blancha
(74) *Attorney, Agent, or Firm* — Ladas & Parry LLP

(57) ABSTRACT

Disclosed are a touch device and a driving method thereof. The touch device includes a touch screen, a detection circuit and a driving circuit, the touch screen including a common electrode, an induction electrode and a pixel electrode, the detection circuit including a first input terminal, a second input terminal and an output terminal, the first input terminal being connected with the induction electrode; during a display period, the common electrode is configured to load a common electrode signal outputted by the driving circuit, the pixel electrode is configured to load a pixel electrode (Continued)

signal outputted by the driving circuit, a display electric field is generated between the common electrode and the pixel electrode, the reference signal is the same as the common electrode signal. In this disclosure, no voltage difference is generated between the common electrode signal and the reference signal, and thus avoiding affecting the normal display of the touch device.

8 Claims, 4 Drawing Sheets

(51) Int. Cl.
 *G02F 1/1343* (2006.01)
 *G02F 1/1368* (2006.01)
(52) U.S. Cl.
 CPC .... *G02F 1/13439* (2013.01); *G02F 1/134309* (2013.01); *G06F 3/0412* (2013.01); *G02F 1/1368* (2013.01); *G02F 2201/121* (2013.01); *G02F 2201/123* (2013.01)

(56) References Cited

U.S. PATENT DOCUMENTS

| | | | |
|---|---|---|---|
| 2013/0093722 A1* | 4/2013 | Noguchi | G06F 3/0412 345/174 |
| 2013/0335366 A1* | 12/2013 | Lee | G06F 3/044 345/174 |
| 2014/0111446 A1* | 4/2014 | Lee | G06F 3/0416 345/173 |
| 2014/0152617 A1* | 6/2014 | Kida | G06F 3/044 345/174 |

FOREIGN PATENT DOCUMENTS

| | | |
|---|---|---|
| CN | 102109690 A | 6/2011 |
| CN | 102637415 A | 8/2012 |
| CN | 102914920 A | 2/2013 |

OTHER PUBLICATIONS

International Search Report & Written Opinion of the International Searching Authority Appln. No. PCT/CN2014/089910; dated May 4, 2015.

* cited by examiner

TOUCH DEVICE AND DRIVING METHOD FOR TOUCH CONTROL DEVICE

TECHNICAL FIELD

The present disclosure relates to a touch device and a driving method thereof.

BACKGROUND

With the development of touch technology, Full In-Cell Touch devices are more and more widely used, wherein ADS (shortened from Advanced Super Dimension Switch) touch device win popularity in application due to advantages of high resolution, high transmittance, low power consumption, wide viewing angle, high aperture ratio etc. Since it needs to ensure normal display and normal touch of the ADS touch device, i.e., it needs to minimize the interference between them, the ADS touch device therefore requires time-sharing driving, that is, performing driving for a display period and a touch period, respectively.

The ADS touch device may include a touch screen and a detection circuit connected with the touch screen, an operational amplifier in the detection circuit needs to load a reference signal, which is a positive voltage, a common electrode in the touch screen needs to load a common electrode signal, which is a negative voltage.

Since the reference signal is a positive voltage and the common electrode signal is a negative voltage, a DC (shortened from Direct Current) voltage difference is generated between the reference signal and the common electrode signal. During the display period, a horizontal electric field generated by the ADS touch device will deflect the liquid crystal to achieve a normal display. The DC voltage difference will cause an electric field in a vertical direction, which causes the liquid crystal also to deflect in the vertical direction, that is to say, the DC voltage difference will affect the normal deflection of the liquid crystal, thus affecting the normal display of the touch device.

SUMMARY

The present disclosure provides a touch device and a driving method thereof, for avoiding the affect on the normal display of the touch device.

At least one embodiment of the present disclosure provides a touch device comprising a touch screen, a detection circuit and a driving circuit, the touch screen including a common electrode, an induction electrode and a pixel electrode, the detection circuit including a first input terminal, a second input terminal and an output terminal, the first input terminal being connected with the induction electrode;

during a touch period, the common electrode is configured to load a drive signal outputted by the driving circuit to couple the common electrode and the induction electrode so as to generate a touch signal and output the same to the first input terminal through the induction electrode, the detection circuit is configured to generate a detection signal according to the touch signal and a reference signal outputted by the driving circuit and loaded on the second input terminal, so as to output the detection signal through the output terminal; and during a display period, the common electrode is configured to load a common electrode signal outputted by the driving circuit, the pixel electrode is configured to load a pixel electrode signal outputted by the driving circuit, a display electric field is generated between the common electrode and the pixel electrode, the reference signal is the same as the common electrode signal.

Optionally, during the touch period, the common electrode is further configured to load a DC signal outputted by the driving circuit, and the DC signal being the same as the reference signal.

Optionally, the common electrode signal is a positive voltage.

Optionally, the pixel electrode signal has an upper limit and a lower limit, the common electrode signal is between the upper limit and the lower limit, the upper limit and the lower limit both are positive voltages.

Optionally, the common electrode includes a plurality of strip-shaped electrodes disposed in parallel, the induction electrode includes a plurality of strip-shaped electrodes disposed in parallel, and an extending direction of the common electrode and an extending direction of the induction electrode are perpendicular to each other.

Optionally, the detection circuit includes a reference signal output device, an operational amplifier, a feedback capacitor and a feedback resistor, the operational amplifier has the first input terminal, the second input terminal and the output terminal, the reference signal output device is connected with the second input terminal, one terminal of the feedback capacitor is connected with the first terminal of the operational amplifier, the other terminal of the feedback capacitor is connected with the output terminal of the operational amplifier, one terminal of the feedback resistor is connected with the first terminal of the operational amplifier, the other terminal of the feedback resistor is connected with the output terminal of the operational amplifier;

the reference signal output device is configured to generate the reference signal and output the same to the second input terminal; and the operational amplifier is configured to receive the touch signal through the first input terminal, and receive the reference signal through the second input terminal and output the detection signal through the output terminal.

Optionally, the touch screen includes a first substrate and a second substrate disposed opposite to each other, liquid crystal is provided between the first substrate and the second substrate, the first substrate includes the common electrode and the pixel electrode, the second substrate includes the induction electrode.

At least one embodiment of the present disclosure further provides a driving method for a touch device, wherein the driving method is for driving the touch device, the touch device includes a touch screen, a detection circuit and a driving circuit, the touch screen includes a common electrode, an induction electrode and a pixel electrode, the detection circuit includes a first input terminal, a second input terminal and an output terminal, the first input terminal is connected with the induction electrode;

the driving method comprises:

during a touch period, the common electrode loading a drive signal outputted by the driving circuit to couple the common electrode and the induction electrode so as to generate a touch signal and output the touch signal to the first input terminal through the induction electrode, the detection circuit generating a detection signal according to the touch signal and a reference signal outputted by the driving circuit and loaded on the second input terminal, so as to output the detection signal through the output terminal; and during a display period, the common electrode loading a common electrode signal outputted by the driving circuit, the pixel electrode loading a pixel electrode signal outputted by the driving circuit, a display electric field being generated between the common electrode and the pixel electrode, the reference signal being the same as the common electrode signal.

Optionally, during the touch period, the common electrode further loads a DC signal outputted by the driving circuit, the DC signal is the same as the reference signal.

Optionally, the common electrode signal is a positive voltage.

In the technical solutions of the touch device and the driving method thereof provided by the embodiments of the present disclosure, during the display period, the common electrode loads a common electrode signal, which is the same as the reference signal loaded on the second input terminal in the detection circuit, and thus no voltage difference is generated between the common electrode signal and the reference signal, thereby not affecting the normal deflection of the liquid crystal, and avoiding affecting the normal display of the touch device.

DETAILED DESCRIPTION OF THE EMBODIMENTS

In order to make those skilled in the art to better understand the technical solutions of the present disclosure, hereinafter, the touch device and the driving method thereof provided by the present disclosure will be described in detail in conjunction with the accompanying drawings.

Figure 1:
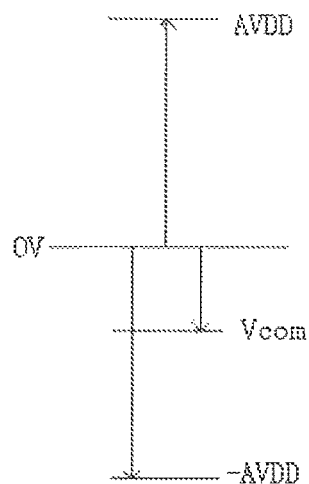
FIG. 1 is a schematic diagram of the common electrode signal according to the prior arts known to the inventors.

FIG. 1 is a schematic diagram of the common electrode signal according to the prior arts known to the inventors. As shown in FIG. 1, the pixel electrode in the touch screen needs to load a pixel electrode signal (i.e. a data voltage signal outputted by a Gamma circuit through a data line, provided to the pixel electrode), the pixel electrode signal has an upper limit AVDD that is a positive voltage and a lower limit −AVDD that is a negative voltage, and the common electrode signal is usually between AVDD and −AVDD. Since during A-Si process, a coupling capacitor Cgs is formed between the gate and the pixel electrode, in order to balance display effect, the common electrode signal is set as a negative value, rather than 0V.

Figure 2:
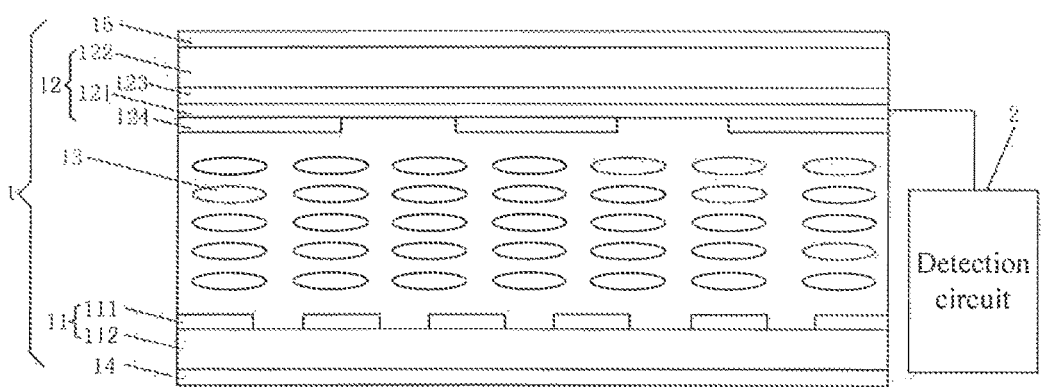
FIG. 2 is a structural schematic diagram of the touch device provided by an embodiment of the present disclosure.

FIG. 2 is a structural schematic diagram of the touch device provided by an embodiment of the present disclosure. As shown in FIG. 2, the touch device comprises a touch screen 1, a detection circuit 2 and a driving circuit (not shown), the touch screen 1 includes a common electrode 111, an induction electrode 121 and a pixel electrode (not shown), the detection circuit 2 includes a first input terminal, a second input terminal and an output terminal, the first input terminal is connected with the induction electrode 121.

During a touch period, the common electrode 111 is configured to load a drive signal outputted by the driving circuit to couple the common electrode 111 and the induction electrode 121 so as to generate a touch signal and output the same to the first input terminal through the induction electrode 121, the detection circuit 2 is configured to generate a detection signal according to the touch signal and a reference signal loaded on the second input terminal, so as to output the detection signal through the output terminal, a touch state and touch coordinates can be determined by the detection signal to implement a touch operation; and during a display period, the common electrode 111 is configured to load a common electrode signal outputted by the driving circuit, the pixel electrode is configured to load a pixel electrode signal outputted by the driving circuit, a display electric field is generated between the common electrode and the pixel electrode, the reference signal is the same as the common electrode signal.

The display electric field is configured to cause the liquid crystal in the touch screen to deflect, to achieve image display.

The pixel electrode signal is a signal outputted by the driving circuit to the pixel electrode through a data line, in a practical application, the pixel electrode signal may also be called a data voltage signal. For instance, if the driving circuit is a Gamma circuit, then the data voltage signal is a Gamma value that has an upper limit and a lower limit, that is, the pixel electrode signal has an upper limit and a lower limit.

In the technical solutions of the touch device provided by the embodiments of the present disclosure, during the display period, the common electrode loads the common electrode signal that is the same as the reference signal loaded on the second input terminal in the detection circuit, and thus no voltage difference is generated between the common electrode signal and the reference signal, thereby not affecting the normal deflection of the liquid crystal, and further avoiding affecting the normal display of the touch device.

In this embodiment, the touch device is an ADS touch device.

Figure 3:
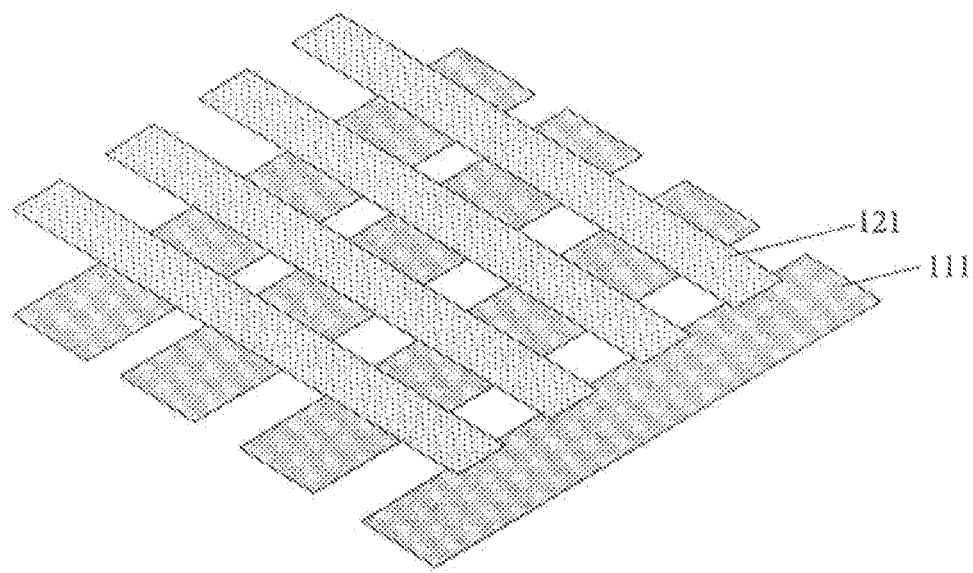
FIG. 3 is a perspective schematic diagram of the common electrode and the induction electrode in FIG. 2.

FIG. 3 is a perspective schematic diagram of the common electrode and the induction electrode in FIG. 2. As shown in FIG. 3, in this embodiment, the common electrode 111 includes a plurality of strip-shaped electrodes disposed in parallel, the induction electrode 121 includes a plurality of strip-shaped electrodes disposed in parallel, an extending direction of the common electrode 111 and an extending direction of the induction electrode 121 are perpendicular to each other. For instance, in this embodiment, the extending direction of the common electrode 111 is longitudinal, and the extending direction of the induction electrode 121 is transverse.

The touch screen 1 may include a first substrate 11 and a second substrate 12 disposed opposite to each other, liquid crystal 13 is provided between the first substrate 11 and the second substrate 12, the first substrate 11 includes the common electrode 111 and the pixel electrode, the second substrate 12 includes the induction electrode 121. In this embodiment, the first substrate 11 may be an array substrate, for instance, the first substrate 11 may include a first base substrate 112 and a gate line and a data line that are formed above the first base substrate 112, the gate line and the data line define a pixel cell that includes a thin film transistor and a pixel electrode, wherein the gate line, the data line, the thin film transistor and the pixel electrode are not shown, the common electrode 111 may be located above the pixel electrode; the second substrate 12 may be a chromatic film substrate, and includes a second base substrate 122, a black matrix pattern 123 and a chromatic matrix pattern 124 that are formed under the second base substrate 122, the black matrix pattern 123 is located on the second base substrate 122, the induction electrode 121 is located on the black matrix pattern 123, the chromatic matrix pattern 124 is located on the induction electrode 121, for instance, the chromatic matrix pattern 124 may be a red matrix pattern, a green matrix pattern or a blue matrix pattern. Structures of the first substrate 11 and the second substrate 12 discussed above are only one example, in practical applications, there may also be the first substrate 11 and the second substrate 12 of other structures, no more listed herein. A projection of the common electrode 111 on the first substrate 112 and a projection of the induction electrode 121 on the first substrate 112 are set in an intersected way.

Further, the touch screen 1 may also include a first polarizing film 14 and a second polarizing film 15, the first polarizing film 14 may be located on a light incident side of the first base substrate 112, the second polarizing plate 15 may be located on a light outgoing side of the second the base substrate 122.

Figure 4:
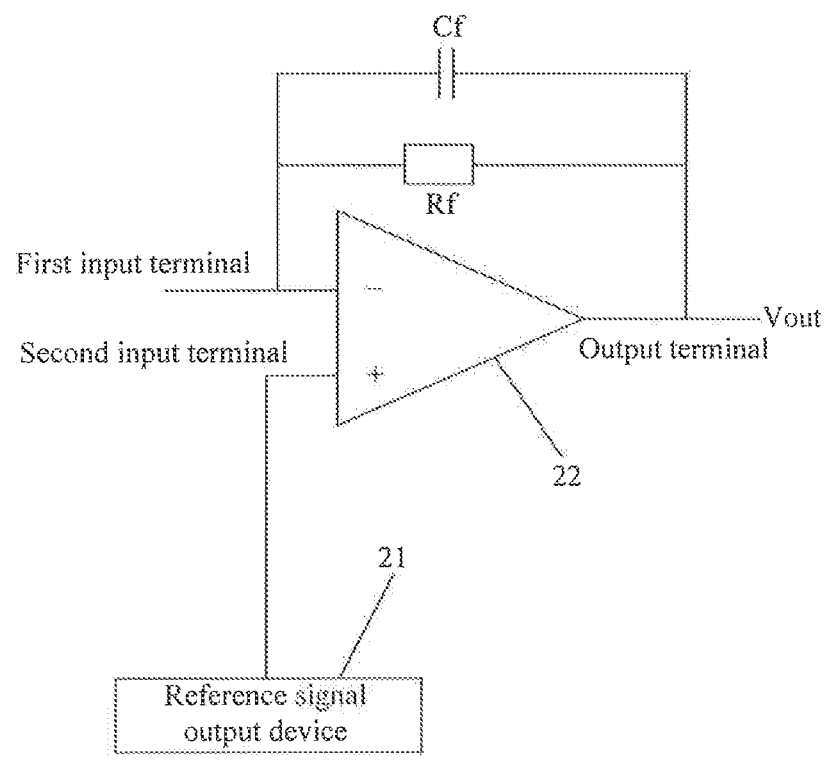
FIG. 4 is a structural schematic diagram of the detection circuit in FIG. 2.

FIG. 4 is a structural schematic diagram of the detection circuit in FIG. 2. As shown in FIG. 4, the detection circuit 2 includes a reference signal output device 21, an operational amplifier 22, a feedback capacitor Cf and a feedback resistor Rf, the operational amplifier 22 includes a first input terminal, a second input terminal and an output terminal, the reference signal output device 21 is connected with the second input terminal, one terminal of the feedback capacitor Cf is connected with the first input terminal of the operational amplifier 22, the other terminal of the feedback capacitor Cf is connected with the output terminal of the operational amplifier 22, one terminal of the feedback resistor Rf is connected with the first input terminal of the operational amplifier 22, the other terminal of the feedback resistor Rf is connected with the output terminal of the operational amplifier 22, wherein the first input terminal is an inverting input terminal of the operational amplifier 22, the second input terminal is a non-inverting input terminal of the operational amplifier 22. The reference signal output device 21 is configured to generate the reference signal and output the reference signal to the second input terminal; and the operational amplifier 22 is configured to receive the touch signal through the first input terminal, and receive the reference signal through the second input terminal and output the detection signal through the output terminal.

Figure 5:
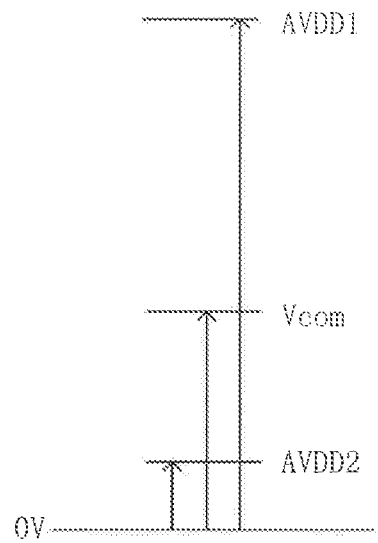
FIG. 5 is a schematic diagram of the common electrode signal in an embodiment of the present disclosure.

FIG. 5 is a schematic diagram of the common electrode signal in an embodiment of the present disclosure. As shown in FIG. 5, in this embodiment, the common electrode signal Vcom is a positive voltage. Since the pixel electrode signal has an upper limit AVDD1 and a lower limit AVDD2, and the common electrode signal Vcom is between the upper limit AVDD1 and the lower limit AVDD2, the upper limit AVDD1 and the lower limit AVDD2 are therefore, for example, both set as a positive voltage, so that the common electrode signal Vcom is a positive voltage. Since the traditional Touch IC usually has no negative voltage manufacture procedure, the reference signal needs to be a positive voltage, the common electrode signal which is a negative voltage therefore cannot be taken as the reference voltage directly, and thus it first needs to raise both the upper limit AVDD1 and the lower limit AVDD2 of the common electrode signal voltage to a positive voltage, so that the common electrode signal Vcom between the upper limit AVDD1 and the lower limit AVDD2 will also be set as a positive voltage, then the common electrode signal can be used as the reference signal directly, that is to say, the reference signal and the common electrode signal are made to be the same.

Figure 6:
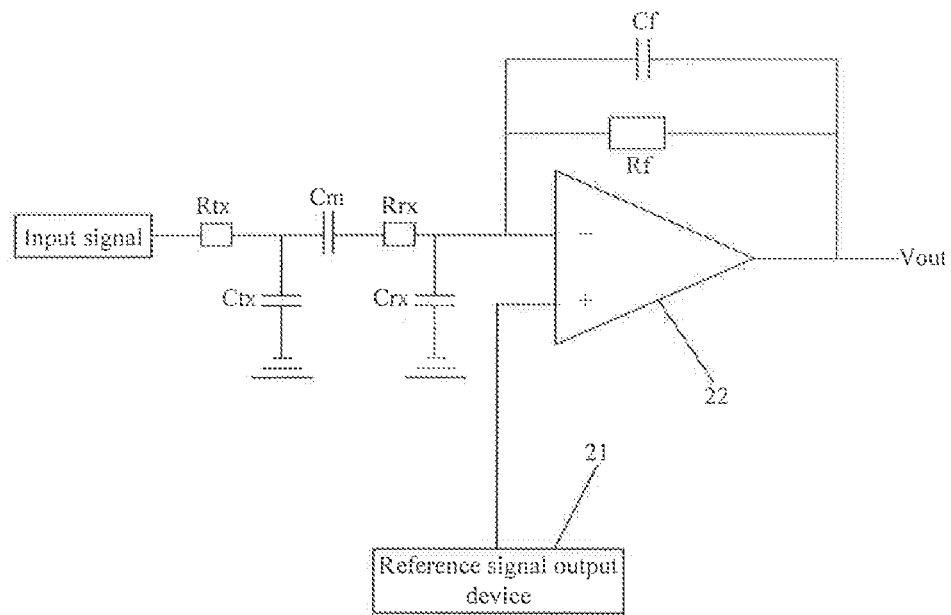
FIG. 6 is a schematic diagram of an equivalent circuit of the touch device in FIG. 2.

FIG. 6 is a schematic diagram of an equivalent circuit of the touch device in FIG. 2. As shown in FIG. 6, an output terminal of an equivalent resistor Rtx of the common electrode 11 is connected to one terminal of a mutual capacitor Cm between the common electrode 111 and the induction electrode 121, the other terminal of the mutual capacitor Cm is connected with an input terminal of the equivalent resistor Rrx of the induction electrode 121, an output terminal of the equivalent resistor Rrx is connected with the first input terminal of the operational amplifier 22, one terminal of the equivalent capacitor Ctx is connected to the output terminal of the Rtx and one terminal of the mutual capacitor Cm, the other terminal of the equivalent capacitor Ctx is grounded, one terminal of the equivalent capacitor Ctx is connected to the output terminal of the equivalent resistor Rrx and the first input terminal of the operational amplifier 22, the other terminal of the equivalent capacitor Ctx is grounded. The input terminal of the equivalent resistor Rtx is for receiving an input signal, the input signal is a common electrode signal when the common electrode 111 serves as a common electrode; the input signal is a drive signal when the common electrode 111 serves as an emitting electrode.

Figure 7:
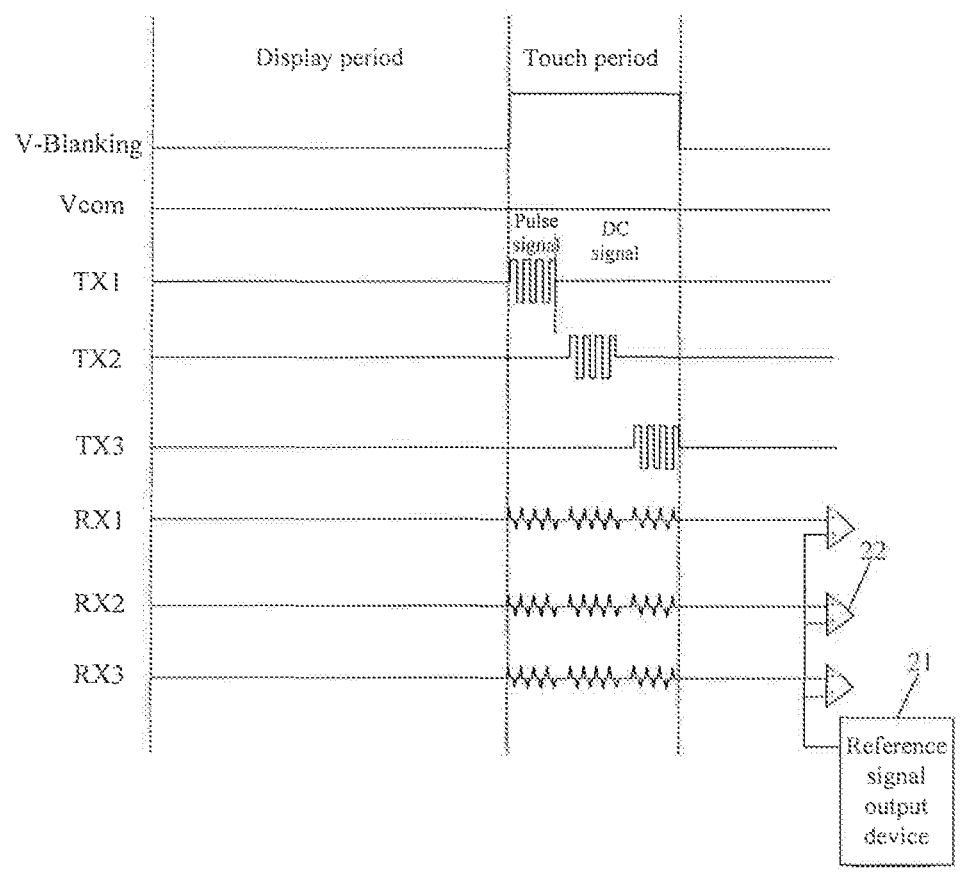
FIG. 7 is a schematic diagram of signal timing of the touch device in FIG. 2.

Next, operating principles of the touch device in this embodiment will be described in detail with reference to FIGS. 6 and 7. FIG. 7 is a schematic diagram of signal timing of the touch device in FIG. 2. As shown in FIGS. 6 and 7, in order to reduce mutual interference between touching and displaying, a time-sharing driving manner can be adopted to drive the touch device, and thus an operating period of the touch device may be divided into a display period and a touch period. The touch period and the display period are differentiated through a frame identification signal (V-Blanking), for instance, as shown in FIG. 6, the touch device is in the touch period when the frame identification signal is a high-level signal, and the touch device is in the display period when the frame identification signal is a low-level signal.

During the display period, the common electrode 111 serves as a common electrode, the common electrode signal Vcom is loaded on the common electrode 111, the pixel electrode signal is loaded on the pixel electrode, and a display electric field for displaying an image is generated between the common electrode and the pixel electrode. During the display period, the reference signal output device 21 will output a reference signal to the operational amplifier 22, since the reference signal is the same as the common electrode signal, there is no voltage difference generated between the reference signal and the common electrode signal, wherein the reference signal and the common signal both are DC voltages. Because there is no voltage difference generated between the reference signal and the common electrode signal, no electric field is generated in a vertical direction, in this way, it can prevent the liquid crystal from deflecting in the vertical direction, avoid an affect on the normal deflection of the liquid crystal, and thus avoid affecting the normal display of the touch device.

During the touch period, the common electrode 111 serves as an emitting electrode TX, the induction electrode 121 is RX, FIG. 7 provides illustration with TX1, TX2, TX3 and RX1, RX2, RX3 as example, a drive signal is loaded on the common electrode 111 to couple the first electrode 11 and the second electrode 21 so as to generate a touch signal, which is a pulse signal, when a touch occurs, the touch signal changes, the detection circuit 2 can generate a detection signal Vout according to the touch signal and a reference signal output by the reference signal output device 21 to the second input terminal, a touch state and touch coordinates can be determined through this detection signal, thus implementing a touch operation. Further, during the touch period, the common electrode 11 is further configured to load a DC signal outputted by the driving circuit, the DC signal is the same as the reference signal, wherein the reference signal and the DC signal both are DC voltages. The DC signal is a constant voltage signal loaded on the common electrode 111 during the touch period, and the DC signal is the same as the reference signal, thus avoiding a DC voltage difference from being generated between the reference signal and the DC signal. Since no DC voltage difference is generated between the reference signal and the DC signal, no electric field is generated in a vertical direction, in this way, it can prevent the liquid crystal from deflecting in the vertical direction, avoid an affect on the normal deflection of the liquid crystal, and thus avoid affecting the normal display of the touch device, an affect on a dielectric constant between the emitting electrode and the induction electrode due to an abnormal deflection of the liquid crystal is avoided, an affect on the mutual capacitor Cm is thereby avoided, and further an affect on the touch of the touch device is avoided.

In summary, the reference signal, the common electrode signal and the DC signal are all the same.

In this embodiment, the driving circuit may be a driving chip. The driving circuit may include a drive signal generating module for generating a drive signal, a common electrode signal generating module for generating a common electrode signal, a pixel electrode signal generating module for generating a pixel electrode signal, and a DC signal generating module for generating a DC signal.

As shown in FIG. 6, since the DC voltage is a positive voltage, the value of the drive signal can be increased, and in this embodiment, increasing of the drive signal will not cause the thin film transistor to turn on, the reasons are provided below: it is supposed that the pixel electrode signal is AVDD2 when one frame of image is displayed, when entering the touch period, the drive signal loaded on the common electrode 111 will have a negative pulse voltage (−AC), in this case, there is a fixed capacitor between the common electrode 111 and the pixel electrode, since a voltage across the fixed capacitor cannot jump, so the pixel electrode signal will also hop by the same amount with that of the drive signal changes, and finally, after the two signals are superimposed together, the voltage across the fixed capacitor is AVDD2-AC. In this embodiment, since AVDD2 is a positive voltage, AVDD2-AC is not lower than a gate off voltage VGL of the thin film transistor, AVDD2-AC will not cause the thin film transistor to turn on again, so that no display error occurs to the touch device. This embodiment therefore can increase a signal-to-noise ratio of the touch under the premise of ensuring a correct display.

In the technical solutions of the touch device provided by the embodiments of the present disclosure, during the display period, the common electrode loads the common electrode signal that is the same as the reference signal loaded on the second input terminal in the detection circuit, and thus no voltage difference is generated between the common electrode signal and the reference signal, thereby it will not affect the normal deflection of the liquid crystal, and further avoid affecting the normal display of the touch device. In the control period, the reference signal is the same as the DC signal, thus no voltage difference is generated between the reference signal and the DC signal, thus it will not affect a normal deflection of the liquid crystal, an affect on a dielectric constant between the emitting electrode and the induction electrode due to an abnormal deflection of the liquid crystal is avoided, an affect on the mutual capacitor Cm is thereby avoided, and further an affect on the touch of the touch device is avoided.

An embodiment of the present disclosure provides a driving method for a touch device, wherein the driving method is for driving the touch device, the touch device includes a touch screen, a detection circuit and a driving circuit, the touch screen including a common electrode, an induction electrode and a pixel electrode, the detection circuit including a first input terminal, a second input terminal and an output terminal, the first input terminal being connected with the induction electrode;

the driving method comprises:

during a touch period, the common electrode loading a drive signal outputted by the driving circuit to couple the common electrode and the induction electrode so as to generate a touch signal and output the touch signal to the first input terminal through the induction electrode, the detection circuit generating a detection signal according to the touch signal and a reference signal loaded on the second input terminal, so as to output the detection signal through the output terminal; and during a display period, the common electrode loading a common electrode signal outputted by the driving circuit, the pixel electrode loading a pixel electrode signal outputted by the driving circuit, a display electric field being generated between the common electrode and the pixel electrode, the reference signal being the same as the common electrode signal.

In this embodiment, during the touch period, the common electrode further loads a DC signal outputted by the driving circuit, the DC signal is the same as the reference signal.

In this embodiment, the common electrode signal is a positive voltage.

In the technical solutions of the touch device provided by the embodiments of the present disclosure, during the display period, the common electrode loads the common electrode signal that is the same as the reference signal loaded on the second input terminal in the detection circuit, and thus no voltage difference is generated between the common electrode signal and the reference signal, thereby it will not affect the normal deflection of the liquid crystal, and further avoid affecting the normal display of the touch device. In the control period, the reference signal is the same as the DC signal, and thus no voltage difference is generated between the reference signal and the DC signal, thus it will not affect a normal deflection of the liquid crystal, an affect on a dielectric constant between the emitting electrode and the induction electrode due to an abnormal deflection of the liquid crystal is avoided, an affect on the mutual capacitor Cm is thereby avoided, and further an affect on the touch of the touch device is avoided.

It should be appreciated that, the above embodiments are merely exemplary ones adopted for explaining the principles of the present disclosure, but the present disclosure is not limited thereto. Those of ordinary skilled in the art can make various changes and modifications without departing from the spirit and essence of the present disclosure, such changes and modifications are also considered as within the protection scope of the present disclosure.

The present application claims priority of Chinese Patent Application No. 201410360047.9 filed on Jul. 25, 2014, the disclosure of which is incorporated in entirety herein by reference as a portion of the present application.

What is claimed is:

1. A touch device comprising a touch screen, a detection circuit and a driving circuit, the touch screen including a common electrode, an induction electrode and a pixel electrode, the detection circuit including a first input terminal, a second input terminal and an output terminal, the first input terminal being connected with the induction electrode; wherein during a first period of a touch period, the common electrode is configured to load a drive signal outputted by the driving circuit to couple the common electrode and the induction electrode so as to generate a touch signal and output the touch signal to the first input terminal through the induction electrode, the detection circuit is configured to generate a detection signal according to the touch signal and a reference signal loaded on the second input terminal, so as to output the detection signal through the output terminal;

during a display period, the common electrode is configured to load a common electrode signal outputted by the driving circuit, the pixel electrode is configured to load a pixel electrode signal outputted by the driving circuit, a display electric field is generated between the common electrode and the pixel electrode, the reference signal is the same as the common electrode signal; and during a second period of the touch period, the common electrode is further configured to load a DC signal outputted by the driving circuit, wherein the DC signal is the same as the reference signal, the common electrode signal is a positive voltage, and the drive signal has a negative pulse voltage so that a minimum level of the driving signal is lower than a level of the DC signal;

wherein the pixel electrode signal has an upper limit and a lower limit, the common electrode signal is between the upper limit and the lower limit, the upper limit and the lower limit both are positive voltages.

2. The touch device as claimed in claim 1, wherein the common electrode includes a plurality of strip-shaped electrodes disposed in parallel, the induction electrode includes a plurality of strip-shaped electrodes disposed in parallel, and an extending direction of the common electrode and an extending direction of the induction electrode are perpendicular to each other.

3. The touch device as claimed in claim 2, wherein the detection circuit includes a reference signal output device, an operational amplifier, a feedback capacitor and a feedback resistor, the operational amplifier includes the first input terminal, the second input terminal and the output terminal, the reference signal output device is connected with the second input terminal, one terminal of the feedback capacitor is connected with a first terminal of the operational amplifier, the other terminal of the feedback capacitor is connected with the output terminal of the operational amplifier, one terminal of the feedback resistor is connected with the first terminal of the operational amplifier, the other terminal of the feedback resistor is connected with the output terminal of the operational amplifier;

the reference signal output device is configured to generate the reference signal and output the reference signal to the second input terminal; and the operational amplifier is configured to receive the touch signal through the first input terminal, and receive the reference signal through the second input terminal and output the detection signal through the output terminal.

4. The touch device as claimed in claim 2, wherein the touch screen includes a first substrate and a second substrate disposed opposite to each other, liquid crystal is provided between the first substrate and the second substrate, the first substrate includes the common electrode and the pixel electrode, the second substrate includes the induction electrode.

5. The touch device as claimed in claim 1, wherein the detection circuit includes a reference signal output device, an operational amplifier, a feedback capacitor and a feedback resistor, the operational amplifier includes the first input terminal, the second input terminal and the output terminal, the reference signal output device is connected with the second input terminal, one terminal of the feedback capacitor is connected with a first terminal of the operational amplifier, the other terminal of the feedback capacitor is connected with the output terminal of the operational amplifier, one terminal of the feedback resistor is connected with the first terminal of the operational amplifier, the other terminal of the feedback resistor is connected with the output terminal of the operational amplifier;

the reference signal output device is configured to generate the reference signal and output the reference signal to the second input terminal; and the operational amplifier is configured to receive the touch signal through the first input terminal, and receive the reference signal through the second input terminal and output the detection signal through the output terminal.

6. The touch device as claimed in claim 5, wherein the touch screen includes a first substrate and a second substrate disposed opposite to each other, liquid crystal is provided between the first substrate and the second substrate, the first substrate includes the common electrode and the pixel electrode, the second substrate includes the induction electrode.

7. The touch device as claimed in claim 1, wherein the touch screen includes a first substrate and a second substrate disposed opposite to each other, liquid crystal is provided between the first substrate and the second substrate, the first substrate includes the common electrode and the pixel electrode, the second substrate includes the induction electrode.

8. A driving method for a touch device, wherein the driving method is for driving the touch device, the touch device includes a touch screen, a detection circuit and a driving circuit, the touch screen includes a common electrode, an induction electrode and a pixel electrode, the detection circuit includes a first input terminal, a second input terminal and an output terminal, the first input terminal is connected with the induction electrode;

the driving method comprises:

during a first period of a touch period, the common electrode loading a drive signal outputted by the driving circuit to couple the common electrode and the induction electrode so as to generate a touch signal and output the touch signal to the first input terminal through the induction electrode, the detection circuit generating a detection signal according to the touch signal and a reference signal loaded on the second input terminal, so as to output the detection signal through the output terminal;

during a display period, the common electrode loading a common electrode signal outputted by the driving circuit, the pixel electrode loading a pixel electrode signal outputted by the driving circuit, a display electric field being generated between the common electrode and the pixel electrode, the reference signal being the same as the common electrode signal; and during a second period of the touch period, the common electrode is further configured to load a DC signal outputted by the driving circuit, wherein the DC signal is the same as the reference signal, the common electrode signal is a positive voltage, and the drive signal has a negative pulse voltage so that a minimum level of the driving signal is lower than a level of the DC signal,
wherein the pixel electrode signal has an upper limit and a lower limit, the common electrode signal is between the upper limit and the lower limit, the upper limit and the lower limit both are positive voltages.

* * * * *